United States Patent
Diederich (10) Patent No.: US 6,809,430 B2
(45) Date of Patent: Oct. 26, 2004

(54) CONVEYOR-TYPE FLUID ENERGY-HARNESSING APPARATUS

(76) Inventor: Jürgen Diederich, 3304 Berta La., Lafayette, CA (US) 94549

( * ) Notice: Subject to any disclaimer, the term of this patent is extended or adjusted under 35 U.S.C. 154(b) by 80 days.

(21) Appl. No.: 10/379,117

(22) Filed: Mar. 4, 2003

(65) Prior Publication Data

US 2004/0174019 A1 Sep. 9, 2004

(51) Int. Cl.[7] ................................................. F03B 9/00
(52) U.S. Cl. ............................... 290/54; 294/55; 416/8
(58) Field of Search ......................... 290/42–44, 53–55; 416/7, 8

(56) References Cited

U.S. PATENT DOCUMENTS

| 443,641 | A | | 12/1890 | Eastman | |
|---|---|---|---|---|---|
| 1,502,296 | A | | 7/1924 | Doak | |
| 4,049,300 | A | | 9/1977 | Schneider | |
| 4,494,008 | A | * | 1/1985 | Patton | 290/44 |
| 4,563,168 | A | | 1/1986 | Schneider | |
| 4,756,666 | A | * | 7/1988 | Labrador | 416/8 |
| 4,859,146 | A | * | 8/1989 | Labrador | 416/8 |
| 5,684,335 | A | * | 11/1997 | Ou | 290/54 |
| 6,072,245 | A | * | 6/2000 | Ockels | 290/55 |

FOREIGN PATENT DOCUMENTS

| FR | 2474106 A1 | * | 7/1981 | | |
|---|---|---|---|---|---|
| FR | 2689184 A1 | * | 10/1993 | | F03B/13/12 |
| JP | 55128669 A | * | 10/1980 | | F03B/13/12 |
| JP | 57151074 A | * | 9/1982 | | F03B/9/00 |

* cited by examiner

Primary Examiner—Joseph Waks
(74) Attorney, Agent, or Firm—James F. Hann; Haynes Beffel & Wolfeld LLP (57) ABSTRACT

A conveyor-type apparatus harnesses energy from a fluid flow, for example a river or a tidal flow region, and comprises a support structure, a continuous-loop, flexible driven element, for example a pair of chains, mounted to the support structure and extending along a closed-loop path, the path defining an interior region and an exterior region, and a series of reversible fluid foils. The driven element has first and second reaches, the first and second reaches being upflow and downflow reaches when fluid flows from the first reach to the second reach. Each fluid foil is connected to the flexible driven element for movement between a first orientation, situated in the interior region when moving along the upflow reach, and a second orientation, situated in the exterior region when moving along the downflow reach. The first sides are generally concave when moving along the upflow reach and generally convex when moving along the downflow reach. The second sides are generally concave when moving along the downflow reach and generally convex when moving along the upflow reach. The driven element may be coupled to an energy generator so to harness energy from the fluid flow.

36 Claims, 9 Drawing Sheets

CONVEYOR-TYPE FLUID ENERGY-HARNESSING APPARATUS

CROSS-REFERENCE TO OTHER APPLICATIONS

None.

STATEMENT REGARDING FEDERALLY SPONSORED RESEARCH OR DEVELOPMENT

None.

REFERENCE TO MICROFICHE APPENDIX

None.

BACKGROUND OF THE INVENTION

The concept of harnessing energy from moving water and the wind continues to be the source of research and innovation. The most common method used to harness energy from moving water involves building a hydroelectric dam and extracting energy by passing water through turbines. Building dams creates problems, including flooding of land, creating barriers to migrating fish and upsetting the natural high and low water flow cycles. Windmills are commonly used for harnessing wind energy. Windmills typically have a number of blades, wings or other fluid foils that rotate about a central, typically horizontally-oriented, drive shaft. Another type of energy-harnessing apparatus is a conveyor-type apparatus in which a number of fluid foils are carried by an endless chain passing between spaced-apart sprockets. Conveyer-type apparatus have been developed for use in both air and water. Some of these apparatus use flexible fabric as the fluid foils; see, for example, U.S. Pat. No. 443,641. Other conveyor-type apparatus use relatively rigid fluid foils; see U.S. Pat. Nos. 1,502,296; 4,049,300; and 4,563,168.

SUMMARY OF THE INVENTION

The present invention is directed to a conveyor-type fluid energy-harnessing apparatus in which reversible fluid foils permit energy to be extracted from the moving fluid along the upstream reach and the downstream reach in a simple and effective manner. The invention may also be used in, for example, tidal flow areas in which the direction of movement of the water periodically reverses itself without the need for changing the orientation of the apparatus.

A first aspect of the invention is directed to a conveyor-type apparatus for harnessing energy from a fluid flow, for example a river, comprising a support structure, a continuous-loop, flexible driven element, for example a pair of chains, mounted to the support structure and extending along a closed-loop path, the path defining an interior region and an exterior region, and a series of reversible fluid foils. The driven element has first and second reaches, the first and second reaches being upflow and downflow reaches when fluid flows from the first reach to the second reach. Each fluid foil comprises first and second sides and is connected to the flexible driven element for movement between a first orientation, situated in the interior region when moving along the upflow reach, and a second orientation, situated in the exterior region when moving along the downflow reach. The first sides of the fluid foils are generally concave when moving along the upflow reach and generally convex when moving along the downflow reach. The second sides are generally concave when moving along the downflow reach and generally convex when moving along the upflow reach. The driven element may be coupled to, for example, an electrical generator to harness energy from the fluid flow.

A second aspect of the invention is directed to method for harnessing energy from a fluid flow. A conveyor-type fluid energy apparatus is positioned at a fluid flow site. The apparatus comprises a support structure, a continuous-loop, flexible driven element mounted to the support structure and extending along a closed-loop path, the path defining an interior region and an exterior region and a series of reversible fluid foils movably connected to the flexible driven element. The driven element has first and second reaches as it moves along the path, said first and second reaches being upflow and downflow reaches when fluid flows from the first reach to the second reach. The driven element is oriented so that the upflow reach is transverse to a fluid flow direction. The fluid foils and the driven element therewith are driven along the upflow reach in a first closed-loop path direction, the fluid foils being driven by the fluid flow with the fluid foils situated in the interior region in a first orientation. The fluid foils move from the first orientation to a second orientation as the fluid foils move along a first transition region along the path from the upstream reach to the downstream reach. The fluid foils and the driven element therewith are driven along the downflow reach in the first closed-loop path direction, the fluid foils being driven by the fluid flow with the fluid foils situated in the exterior region when in the second orientation. The fluid foils move from the second orientation to the first orientation as the fluid foils move along a second transition region along the path from the downstream reach to the upstream reach. The driven element may therefore be coupled to, for example, an electrical generator to harness energy from the fluid flow.

The present invention finds particular utility for harnessing energy from river or tidal flows. The fluid foils may act like series of sails as they move along the upflow reach and the downflow reach and are driven by the fluid flow along both reaches. The series of fluid foils are preferably submerged below the surface of the water so that floating debris passes over the apparatus as opposed to being snagged in the apparatus. The apparatus may be designed so that it can be towed to optimum water flow locations without the need for a barge or complicated procedures for transporting the apparatus. The apparatus can be designed to be, for example, supported on the bottom of a river or suspended from floating pontoons or other appropriate structures. The invention is suitable for use in even relatively shallow waterways.

Other features and advantages of the invention will appear from the following description in which the preferred embodiments have been set forth in detail in conjunction with the accompanying drawings.

DESCRIPTION OF THE SPECIFIC EMBODIMENTS

Referring first to FIGS. 1–4, a conveyor-type fluid energy-harnessing apparatus 10 is shown. Apparatus 10 is constructed for use in waterways, such as in rivers and tidal flow areas. Apparatus made according to the invention can also be constructed to harness energy from other moving water. However, apparatus made according to the invention may also be constructed for harnessing wind energy as well as energy from moving water.

Apparatus 10 comprises a support structure or frame 12 having end members 14, 16 an upper transverse member 18 and a lower transverse member 20. Lower transverse member 20 rests on the bottom 22 of the river 24 or other waterway. A pair of shafts 26, 28 extends between upper and lower transverse members 18, 20 near end members 14, 16. Each shaft 26, 28 supports an upper sprocket 30 and a lower sprocket 32. Continuous loop upper and lower chains 34, 36 extend around and engage upper and lower sprocket 30, 32. Chains 34, 36 define a closed loop path 38, the path defining an interior region 40 and an exterior region 42. A series of sail-like reversible fluid foils 44 are secured to and mounted between upper and lower chains 34, 36. Foils 44 have first ends 43 and second ends 45. As shown best in FIGS. 3–7, each fluid foil comprises a leading end 46 and a trailing end 48. The enlarged leading end 46 of fluid foil 44 is secured to and between outer and inner chains 34, 36 by a pivot shaft assembly 50, see FIG. 7A, to permit the fluid foil to freely pivot about its leading end 46. Trailing end 48 of fluid foil 44 is connected to flexible fluid foil sheeting 52. Sheeting 52 limits the movement of foil 44 to a first orientation, shown in FIGS. 3–5, within interior region 40 as fluid foil 44 passes along an upflow reach 53 of chains 34, 36. Sheeting 52 also limits the movement of foil 44 to a second orientation, shown in FIGS. 3 and 4, within the exterior region 42 as fluid foil 44 passes along a downflow reach 54 of chains 34, 36. The identification of upflow and downflow reaches 52, 54 is based upon the direction of the fluid flow, indicated by flow direction arrow 56. As will be discussed below, one of the advantages of apparatus 10 is that the apparatus can be used in, for example, tidal flow regions where flow direction 56 reverses without changing the position of the apparatus.

Figure 1:
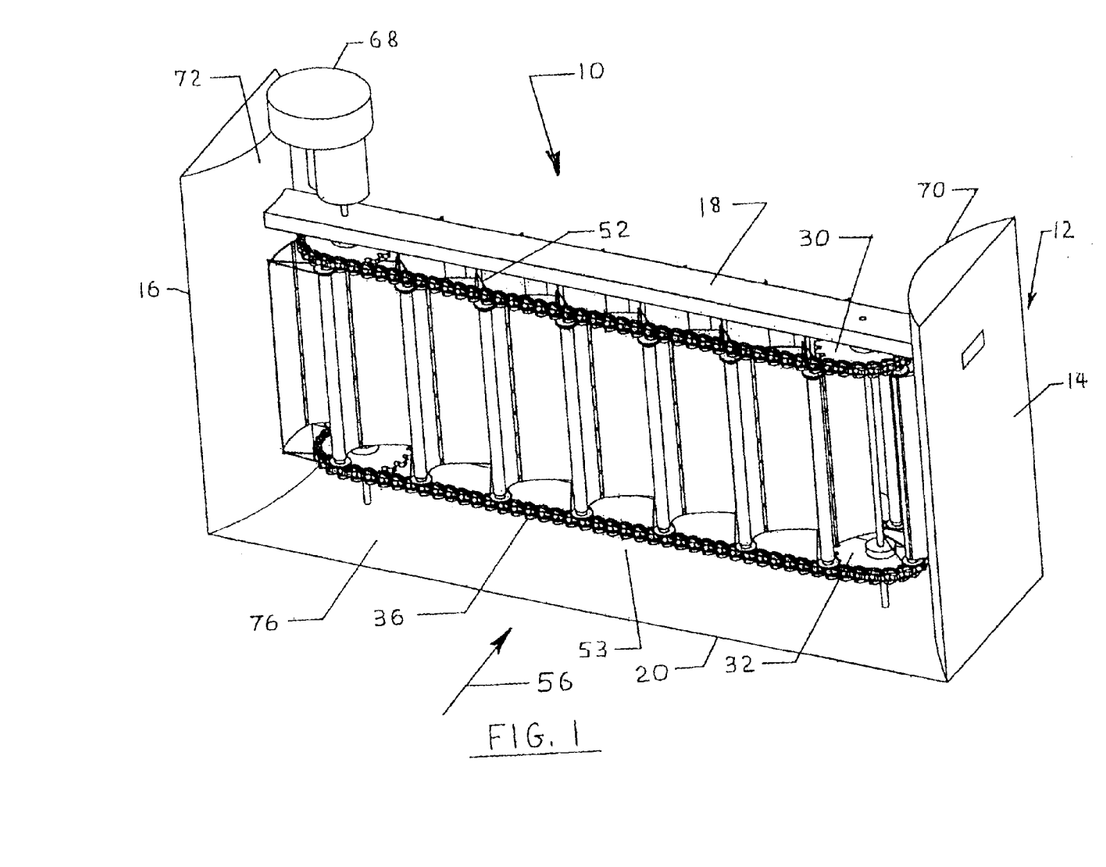
FIG. 1 is an isometric view of a conveyor-type fluid energy-harnessing apparatus made according to the invention.
Figure 2:
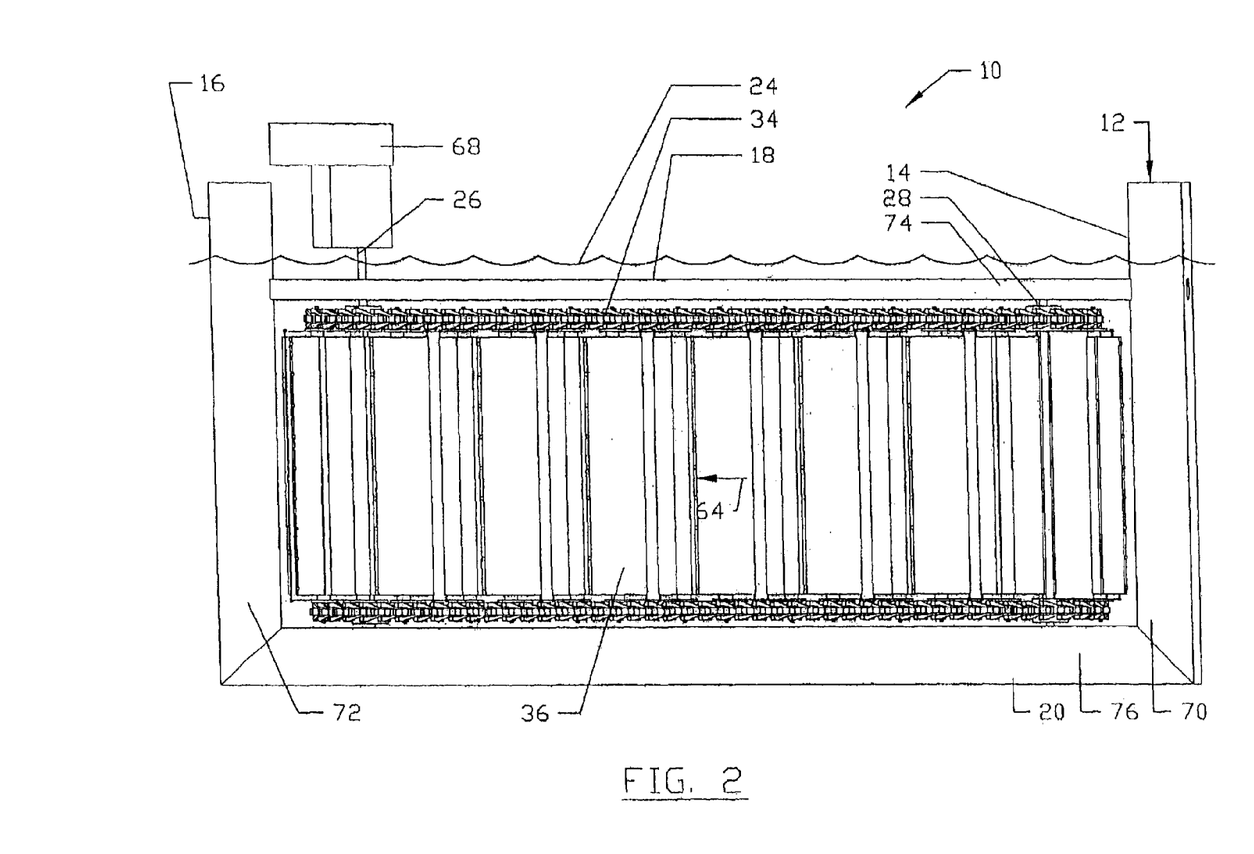
FIG. 2 is a side view of the apparatus of FIG. 1 shown resting on the bottom of a river.
Figure 3:
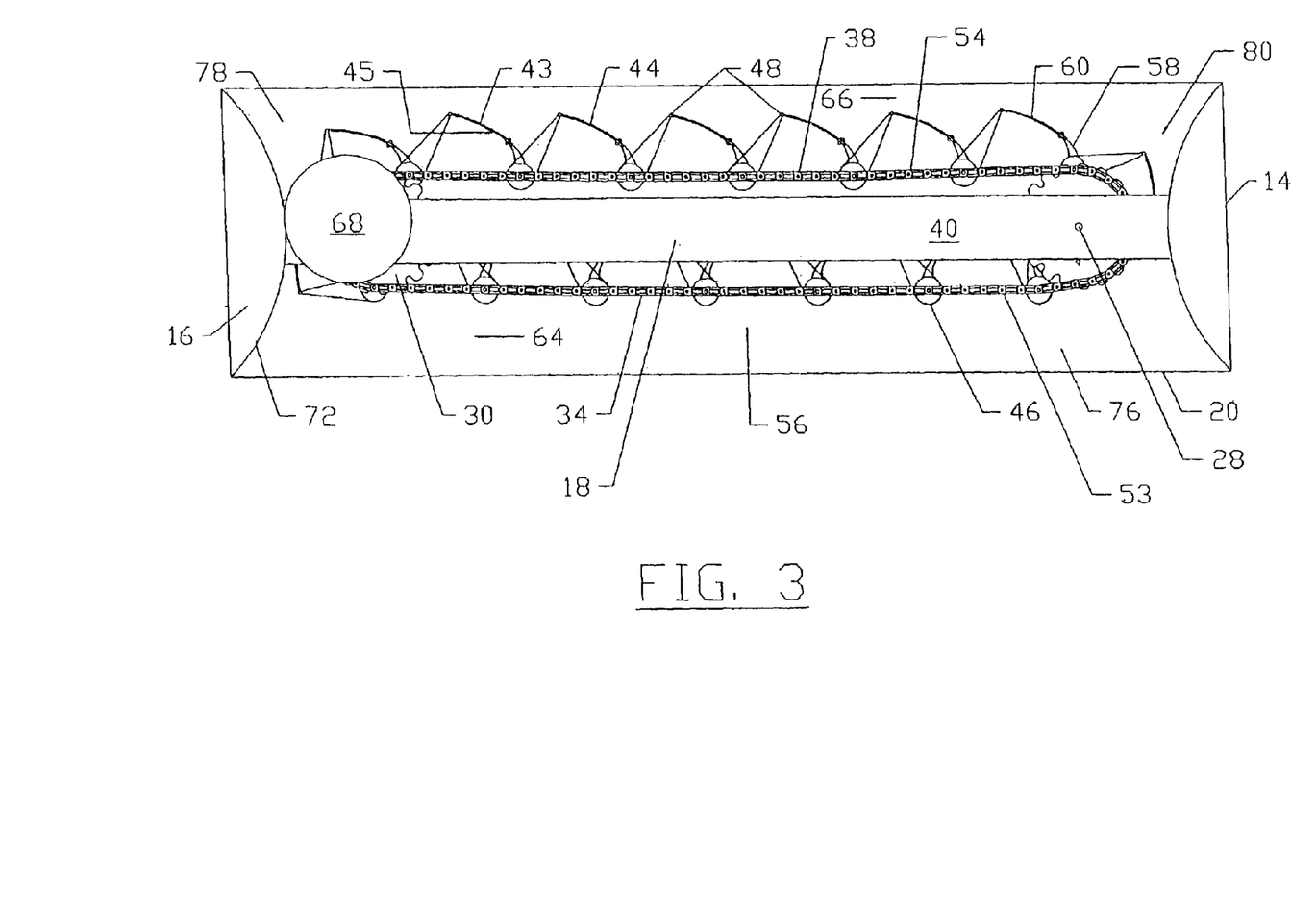
FIG. 3 is a schematic plan view of the apparatus of FIG. 1.
Figure 3A:
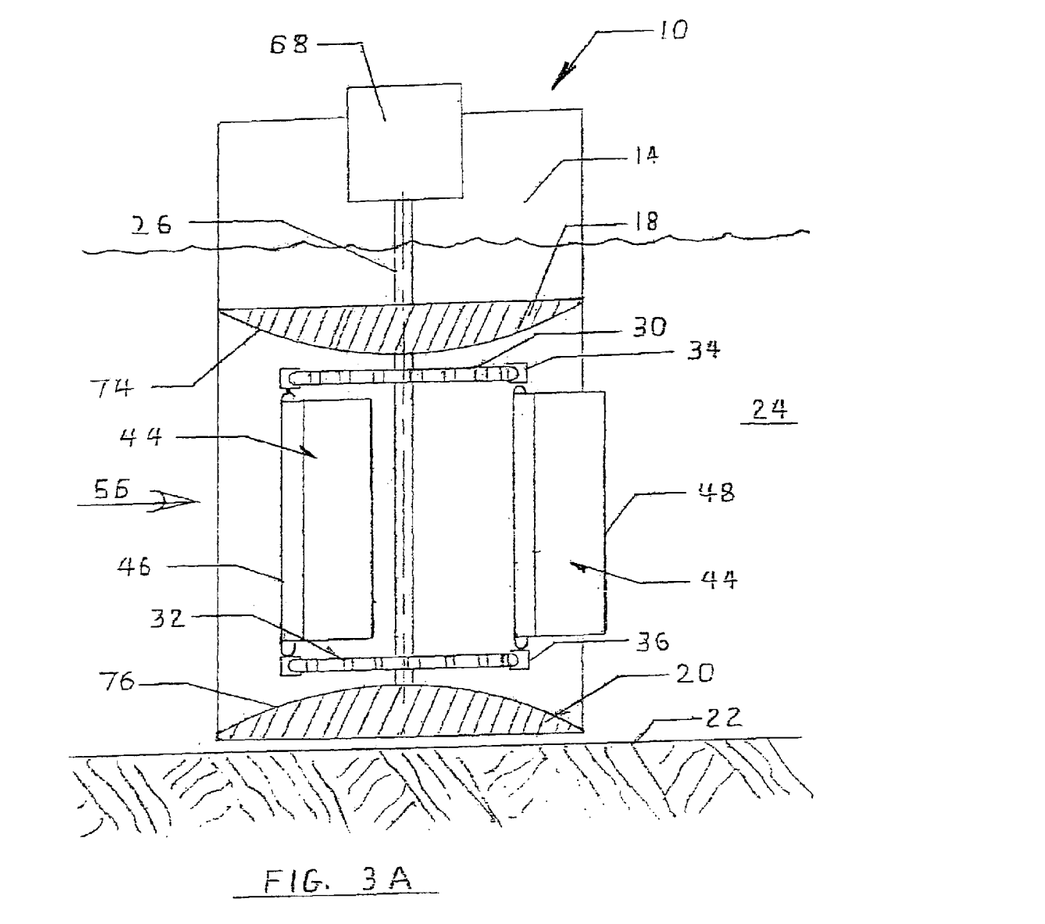
FIG. 3A is a simplified schematic cross-sectional view of the apparatus of FIG. 3.
Figure 4:
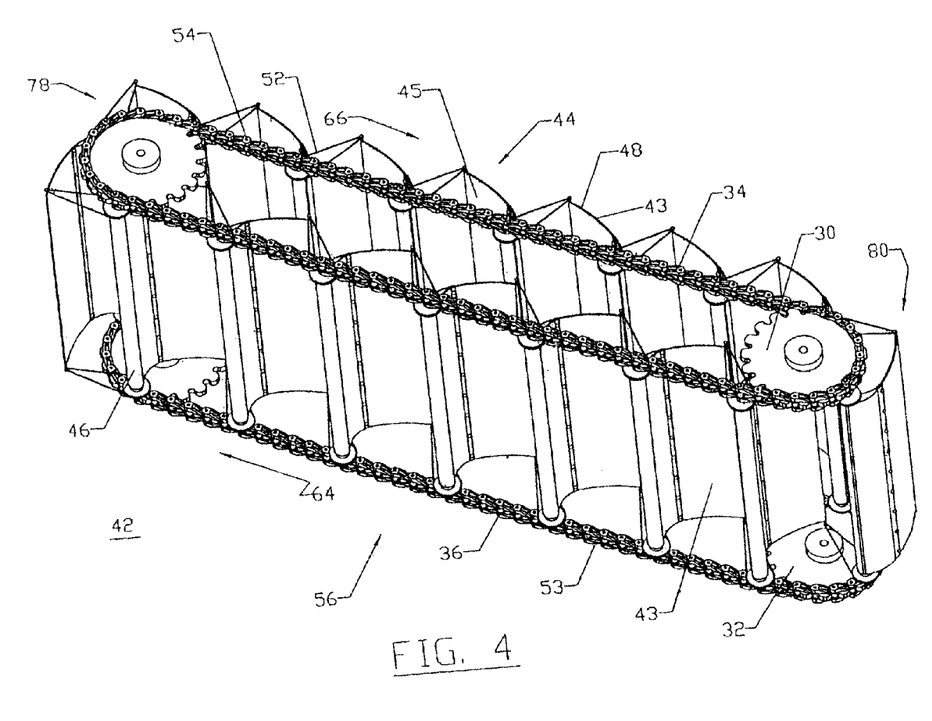
FIG. 4 is an isometric view of the chains and fluid foils of FIG. 1.
Figure 5:
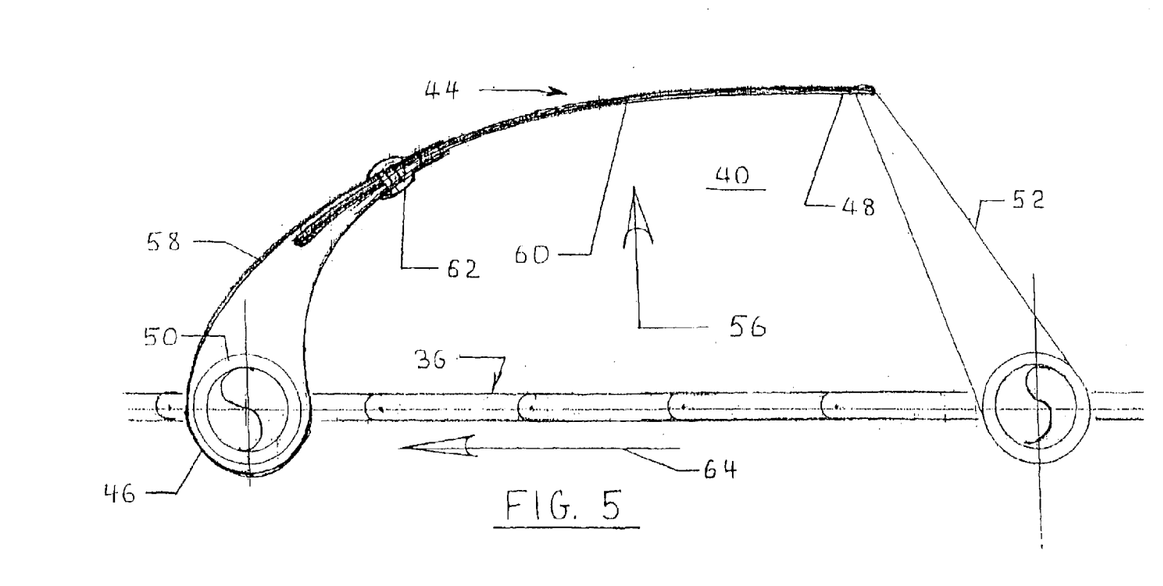
FIG. 5 is a simplified enlarged view of one of the fluid foils along the upflow reach, the fluid foil being deflected into its asymmetrical fluid foil shaped by the current with the trailing end of the fluid foil being restrained by fluid foil sheeting.
Figure 6:
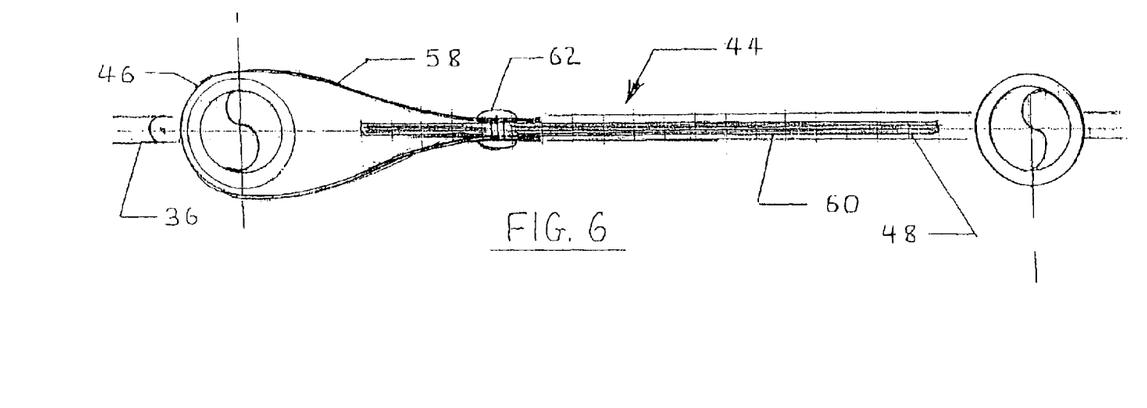
FIG. 6 illustrates the fluid foil of FIG. 5 and generally straight, relaxed state when the fluid foil is not been deflected by a flowing fluid.
Figure 7:
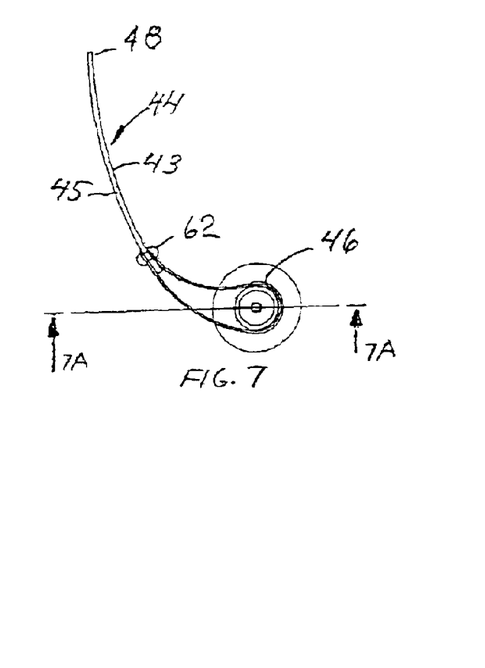
FIG. 7 is a top or end view of one of the fluid foils of FIG. 4.
Figure 7A:
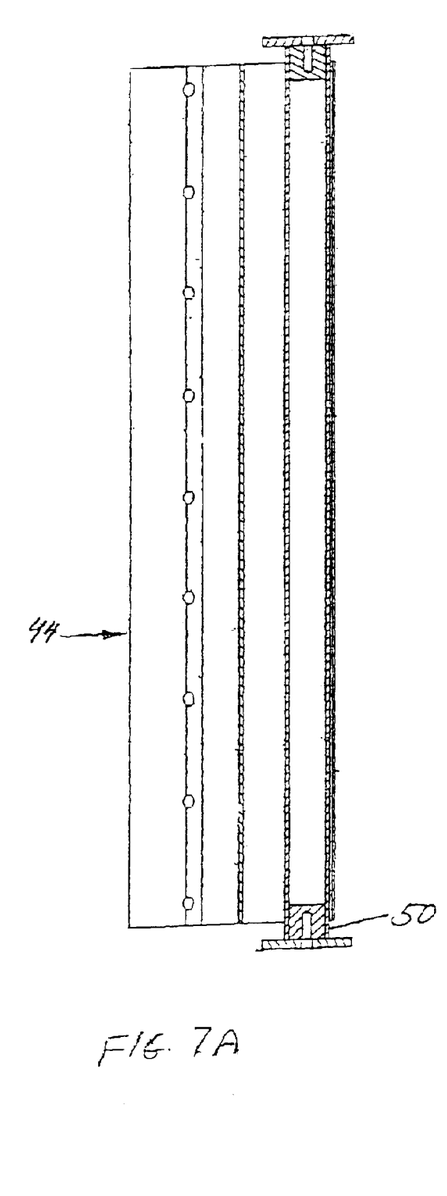
FIG. 7A is a cross-sectional view taken along the line 7A-7A of FIG. 7.

In the embodiment illustrated in FIGS. 5–7, fluid foil 44 comprises a leading portion 58 and a trailing portion 60. Leading portion 58 is made from a thermosetting plastic sheet heat formed into the general shape illustrated in FIG. 6. Trailing portion 60, in one embodiment, comprises a plywood body encased in fiberglass and secured to leading portion 58 by rivets 62. Under the influence of the water current, indicated by flow direction arrow 56, foil 44 moves from its generally straight, relaxed state of FIG. 6 to the asymmetrical fluid foil shape of FIG. 5 causing chains 34, 36 to move in the direction of arrows 64, 66 because of the differential in pressure between the upstream and the downstream sides of foil 44. In this embodiment fluid foil sheeting 52 is a rope, line or other flexible member. The distance trailing end 48 can move on either side of closed loop path 38 can be adjusted by, for example, changing the length of sheeting 52 and/or limiting how far leading end 46 of fluid foil 44 can pivot in either direction. The optimal shape for fluid foil 44 may vary depending upon operating conditions. Therefore, fluid foil 44 may be made to allow the user to adjust its flexibility by, for example, making the position of rivet 62 adjustable or adding or subtracting stiffening elements along fluid foil 44. Fluid foil 44 may be constructed to cause the fluid foil to automatically adjust its angular orientation and/or shape according to flow condition, and so doing could eliminate the need for sheeting.

Upper and lower sprockets 30, 32 are keyed to drive shaft 26 so that movement of upper and lower chains 34, 36 along closed loop path 38 causes drive shaft 26 to rotate therefore driving an electrical generator 68 connected to drive shaft 26 and mounted to frame 12. Instead of generator 68, drive shaft 26 could be connected to a pump or other device that can use the energy from drive shaft 26. Frame members 14–20 have fluid-channeling surfaces 70, 72, 74 and 76 to help direct fluid flow towards upflow reach 53 and thus towards foils 44 along both upflow reach 53 and downflow reach 54.

In use, apparatus 10 is placed at a suitable position on the bottom 22 of a waterway, typically a river 24, in which flow direction 56 remains the same, or a flow-reversing region, such as a tidal flow area, in which flow direction 56 periodically reverses itself. The depth of water at the site need only be, for example, about three feet (1 m) deep. Greater depths are, of course, suitable. If the depth is too great, apparatus 10 may be supported on poles or pilings or suspended from pontoons or other flotation devices. Is preferred that upper transverse member 18 be positioned below the surface of the water so that floating debris tends to pass over the device. The water flow in flow direction 56, see FIGS. 1, 3 and 4, cause fluid foils 44 to assume the first orientation along upflow reach 53, with first sides 43 concave and second sides 45 convex, and the second orientation along downflow reach 54, with first sides 43 convex and second sides 45 concave. The fluid flow causes foils 44 to drive chains 34, 36 along closed loop path 38 in the direction of arrows 64, 66. When fluid foils 44 reach the end of upflow reach 53, they stop driving chains 34, 36 and naturally begin a jibing sequence 78 similar to that occurring to a sailboat sail. During this jibing sequence foils 44 move from the first orientation in interior region 40 to the second orientation in exterior region 42. They then move in the direction of arrow 44 along downflow reach 54 driving chains 34, 36 along path 38. When fluid foils 44 reach the end of downflow reach 54, they stop driving chains 36, 38 and naturally begin a tacking sequence 80 similar to that occurring to a sailboat sail, moving from exterior region 42 to interior region 40 and again begin the chain-driving movement along upflow reach 54. Assuming the waterway is in a region where flow direction 56 reverses, such as a tidal region, the designations of the upflow reach and the downflow reach reverse. However, due to the construction of apparatus 10, chains 34, 36 continue to be driven in the same direction along closed loop path 38.

Figure 8:
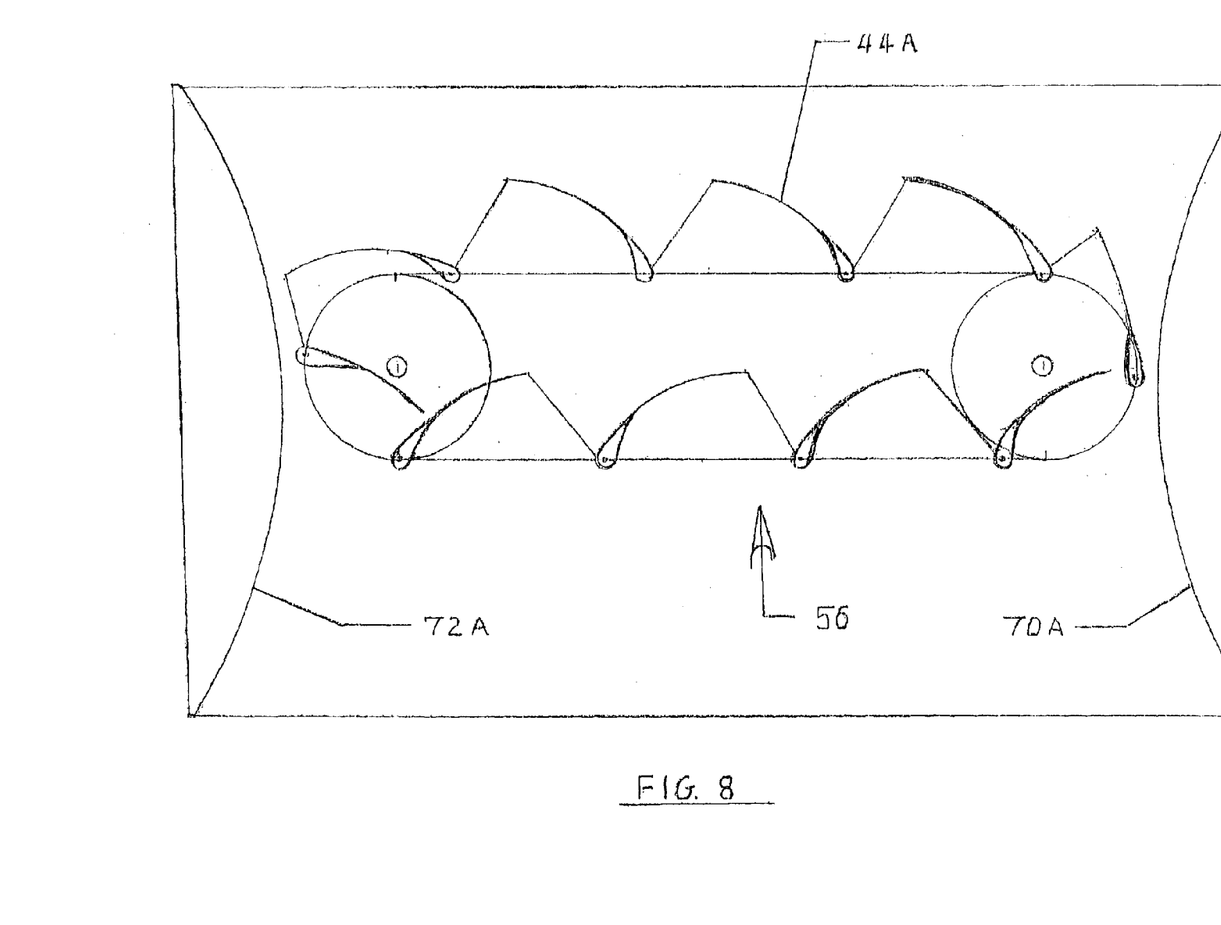
FIG. 8 is an illustration similar to that of FIG. 3 of an alternative embodiment of the invention.
Figure 9:
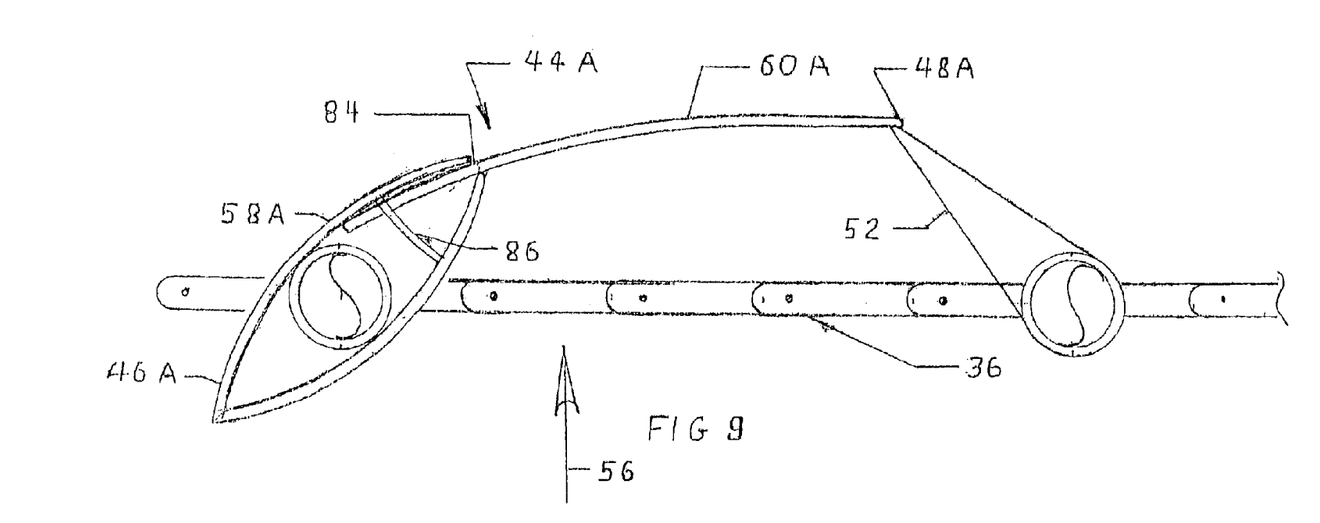
FIGS. 9 and 10 are views similar to FIGS. 5 and 6 of the alternative fluid foils of FIG. 8.
Figure 10:
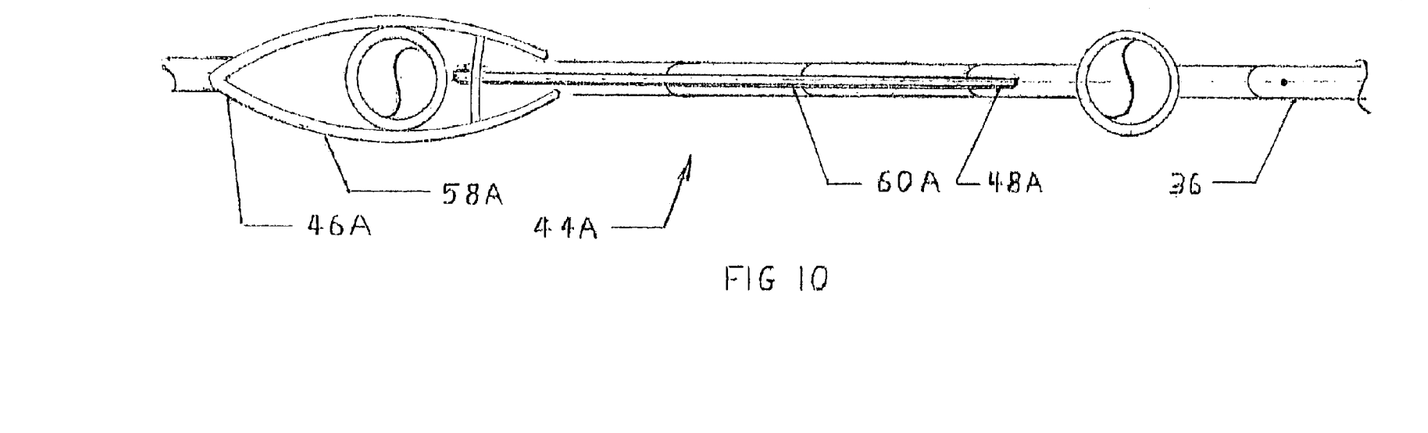

FIGS. 8, 9 and 10 illustrate an alternative embodiment of the invention with like reference numerals referring to like elements. Fluid-channeling surfaces 70A and 72A are shaped somewhat differently to accommodate the somewhat slightly different movement of foils 44A. Instead of being securely clamped to leading portion 58A, a curved member 86 of leading portion 58 passes through an opening in trailing portion 60A so that the trailing portion essentially pivots about a distal opening 84 formed in leading portion 58A.

Modification and variation can be made to the disclosed embodiments without departing from the subject of the invention as defined in the following claims. For example, it may be possible to construct fluid foil 44 so that the cross-sectional shape of fluid foil 44 changes according to the pivotal orientation of the fluid foil. Frame 12 could be mounted to pivot about a vertical axis to remain aligned with flow direction 56; this pivotal movement could be limited to small angles, such as 10°–30°, to accommodate small changes in fluid flow direction 56 or it could permit essentially unrestricted pivotal movement to accommodate complete (about 180°) reversal of fluid flow direction 56 in, for example, tidal flow areas. Fluid foil 44 could be constructed from a variety of materials, including metal, polymers, composites, fabrics, etc., and may be made as a single, typically molded, element or from a number of elements rigidly and/or movably secured to one another.

Any and all patents, applications, and printed publications referred to above are incorporated by reference.

What is claimed is:

1. A conveyor-type apparatus for harnessing energy from a fluid flow comprising:
    a support structure;
    a continuous-loop, flexible driven element mounted to the support structure and extending along a closed-loop path, the path defining an interior region and an exterior region;
    the driven element having first and second reaches, said first and second reaches being upflow and downflow reaches when fluid flows from the first reach to the second reach;
    a series of reversible fluid foils; and
    each fluid foil comprising first and second sides and being connected to the flexible driven element for movement between a first orientation, situated in the interior region when moving along the upflow reach, and a second orientation, situated in the exterior region when moving along the downflow reach, so that:
        the first sides are generally concave when moving along the upflow reach and generally convex when moving along the downflow reach; and
        the second sides are generally concave when moving along the downflow reach and generally convex when moving along the upflow reach;
    whereby the driven element may be coupled to an energy generator so to harness energy from the fluid flow.

2. The apparatus according to claim 1 wherein the support structure comprises a frame with end members and first and second transverse member connecting the end members to one another.

3. The apparatus according to claim 1 wherein the end members have fluid-channeling surfaces to direct fluid towards the upflow reach.

4. The apparatus according to claim 1 wherein the transverse members have fluid-channeling surfaces to direct fluid towards the upflow reach.

5. The assembly according to claim 1 wherein the support structure comprises first and second rotatable guides engaging the driven element.

6. The assembly according to claim 5 wherein the driven element comprises a chain and the first and second rotatable guides comprise sprockets.

7. The assembly according to claim 5 wherein the first guide drivenly engages the driven element.

8. The apparatus according to claim 7 wherein:
    the flexible driven element comprises first and second continuous-loop chains; and
    the support structure comprises:
        first and second parallel, spaced-apart transverse members extending between the end members, the end and transverse members having fluid-channeling surfaces to direct fluid towards the upflow reach;
        first and second shafts extending between the first and second transverse members; and
        sprockets mounted to each of the first and second shafts and engaging the first and second chains.

9. The apparatus according to claim 1 wherein the path is a generally horizontal path.

10. The apparatus according to claim 1 wherein at least some of the reversible fluid foils comprise a leading end mounted to the driven element and a trailing end.

11. The apparatus according to claim 10 wherein the leading end comprises a leading edge and the trailing end comprises a trailing edge.

12. The apparatus according to claim 10 wherein the leading end is pivotally mounted to the driven element.

13. The apparatus according to claim 12 wherein the fluid foils pivot freely between the first and second orientations.

14. The apparatus according to claim 10 wherein the trailing end is connected to the driven element by a flexible member to limit the movement of the fluid foils to movement between the first and second orientations.

15. The apparatus according to claim 1 wherein the fluid foils are resilient and tend to return to a generally straight, relaxed state.

16. The apparatus according to claim 1 further comprising means for adjusting at least one of the first and second orientations.

17. The apparatus according to claim 1 wherein:
    the path is a generally horizontal path;
    the reversible fluid foils comprise a leading end, pivotally mounted to the driven element so to pivot freely between the first and second orientations, and a trailing end;
    the trailing end is connected to the driven element by a flexible member to limit the movement of the fluid foils to movement between the first and second orientations; and
    the fluid foils are resilient and tend to return to a generally straight, relaxed state; and further comprising:
    means for adjusting at least one of the first and second orientations.

18. The apparatus according to claim 1 wherein said first and second reaches are downflow and upflow reaches when fluid flows from the second reach to the first reach.

19. A conveyor-type apparatus for harnessing energy from moving water comprising:
    a support structure comprising:
        a frame with generally vertical end members and first and second spaced-apart transverse members extending between the end members and connecting the end members to one another;
        first and second shafts extending between the first and second transverse members; and
        sprockets mounted to each of the first and second shafts;

first and second continuous-loop chains engaging the sprockets to extend along first and second spaced apart, generally horizontal closed-loop paths, the paths defining an interior region and an exterior region;

the chains having first and second reaches, said first and second reaches being upflow and downflow reaches when fluid flows from the first reach to the second reach, said first and second reaches being downflow and upflow reaches when fluid flows from the second reach to the first reach;

the end and transverse members having fluid-channeling surfaces to direct fluid towards the upflow reach;

a series of reversible fluid foils comprising first and second sides; and each fluid foil comprising a leading end pivotally connected to the chains and a trailing end connected to at least one of the chains by a movable member to limit the movement of the fluid foils to movement between a first pivotal orientation, situated in the interior region when moving along the upflow reach, and a second pivotal orientation, situated in the exterior region when moving along the downflow reach, so that:

the first sides are generally concave when moving along the upflow reach and generally convex when moving along the downflow reach; and the second sides are generally concave when moving along the downflow reach and generally convex when moving along the upflow reach;

whereby the driven element may be coupled to an energy generator so to harness energy from the fluid flow.

20. The apparatus according to claim 19 wherein the fluid foils pivot freely between the first and second orientations.

21. The apparatus according to claim 19 wherein the fluid foils are resilient and tend to return to a generally straight, relaxed state.

22. The apparatus according to claim 19 further comprising means for adjusting at least one of the first and second orientations.

23. A method for harnessing energy from a fluid flow comprising:

positioning a conveyor-type fluid energy apparatus at a fluid flow site, the apparatus comprising:

a support structure;

a continuous-loop, flexible driven element mounted to the support structure and extending along a closed-loop path, the path defining an interior region and an exterior region;

the driven element having first and second reaches as it moves along the path, said first and second reaches being upflow and downflow reaches when fluid flows from the first reach to the second reach; and a series of reversible fluid foils movably connected to the flexible driven element;

orienting the driven element so that the upflow reach is transverse to a fluid flow direction;

driving fluid foils and the driven element therewith along the upflow reach in a first closed-loop path direction, the fluid foils being driven by the fluid flow with the fluid foils situated in the interior region in a first orientation;

the fluid foils moving from the first orientation to a second orientation as the fluid foils move along a first transition region along the path from the upstream reach to the downstream reach;

driving fluid foils and the driven element therewith along the downflow reach in the first closed-loop path direction, the fluid foils being driven by the fluid flow with the fluid foils situated in the exterior region in the second orientation; and the fluid foils moving from the second orientation to the first orientation as the fluid foils move along a second transition region along the path from the downstream reach to the upstream reach;

whereby the driven element may be coupled to an energy generator so to harness energy from the fluid flow.

24. The method according to claim 23 wherein the positioning step comprises positioning the fluid energy apparatus at a fluid flow site within a river so that the fluid flow is in a single, downstream direction.

25. The method according to claim 23 wherein the positioning step comprises positioning the fluid energy apparatus at a fluid flow site within a dual-flow-direction region so that the fluid flow alternates between an upstream direction and a downstream direction.

26. The method according to claim 25 wherein the positioning step comprises positioning the fluid energy apparatus at a fluid flow site within a tidal region.

27. The method according to claim 23 wherein the positioning step is carried out using flexible sails as the fluid foils.

28. The method according to claim 27 wherein the positioning step is carried out with said second and first reaches being upflow and downflow reaches when fluid flows from the second reach to the first reach.

29. The method according to claim 23 wherein the positioning step is carried out with the first and second reaches being generally straight.

30. The method according to claim 23 wherein the positioning step is carried out with the first and second reaches being generally parallel to one another.

31. The method according to claim 23 wherein the orienting step is carried out so that the upflow reach is generally perpendicular to the fluid flow direction.

32. The method according to claim 23 wherein during the first fluid foils moving step the fluid foils act as sails and jibe from the first orientation to the second orientation.

33. The method according to claim 23 wherein during the first fluid foils moving step the fluid foils act as sails and freely jibe from the first orientation to the second orientation.

34. The method according to claim 23 wherein during the second fluid foils moving step the fluid foils act as sails and tack from the second orientation to the first orientation.

35. The method according to claim 23 wherein during the second fluid foils moving step the fluid foils act as sails and freely tack from the second orientation to the first orientation.

36. A method for harnessing energy from a fluid flow comprising:

positioning a conveyor-type fluid energy apparatus at a fluid flow site, the apparatus comprising:

a support structure;

a continuous-loop, flexible driven element mounted to the support structure and extending along a closed-loop path, the path defining an interior region and an exterior region;

the driven element having first and second generally straight reaches as it moves along the path, the upflow reach being generally perpendicular to the fluid flow direction;

said first and second reaches being upflow and downflow reaches when fluid flows from the first reach to the second reach;

said second and first reaches being upflow and downflow reaches when fluid flows from the second reach to the first reach; and a series of reversible, flexible sails acting as fluid foils movably connected to the flexible driven element;

orienting the driven element so that the upflow reach is transverse to a fluid flow direction;

driving fluid foils and the driven element therewith along the upflow reach in a first closed-loop path direction, the fluid foils being driven by the fluid flow with the fluid foils situated in the interior region in a first orientation;

the fluid foils freely jibing from the first orientation to a second orientation as the fluid foils move along a first transition region along the path from the upstream reach to the downstream reach;

driving fluid foils and the driven element therewith along the downflow reach in the first closed-loop path direction, the fluid foils being driven by the fluid flow with the fluid foils situated in the exterior region in the second orientation; and the fluid foils freely tacking from the second orientation to the first orientation as the fluid foils move along a second transition region along the path from the downstream reach to the upstream reach;

whereby the driven element may be coupled to an energy generator so to harness energy from the fluid flow.

* * * * *